Oct. 4, 1966 H. B. DIAMANT ETAL 3,277,446
ADDRESS MODIFICATION SYSTEM AND NOVEL PARALLEL
TO SERIAL TRANSLATOR THEREFOR
Filed July 5, 1962 3 Sheets-Sheet 1

INVENTORS
HENRI B. DIAMANT
PHILLIP F. EILAND JR
BY
ATTORNEYS

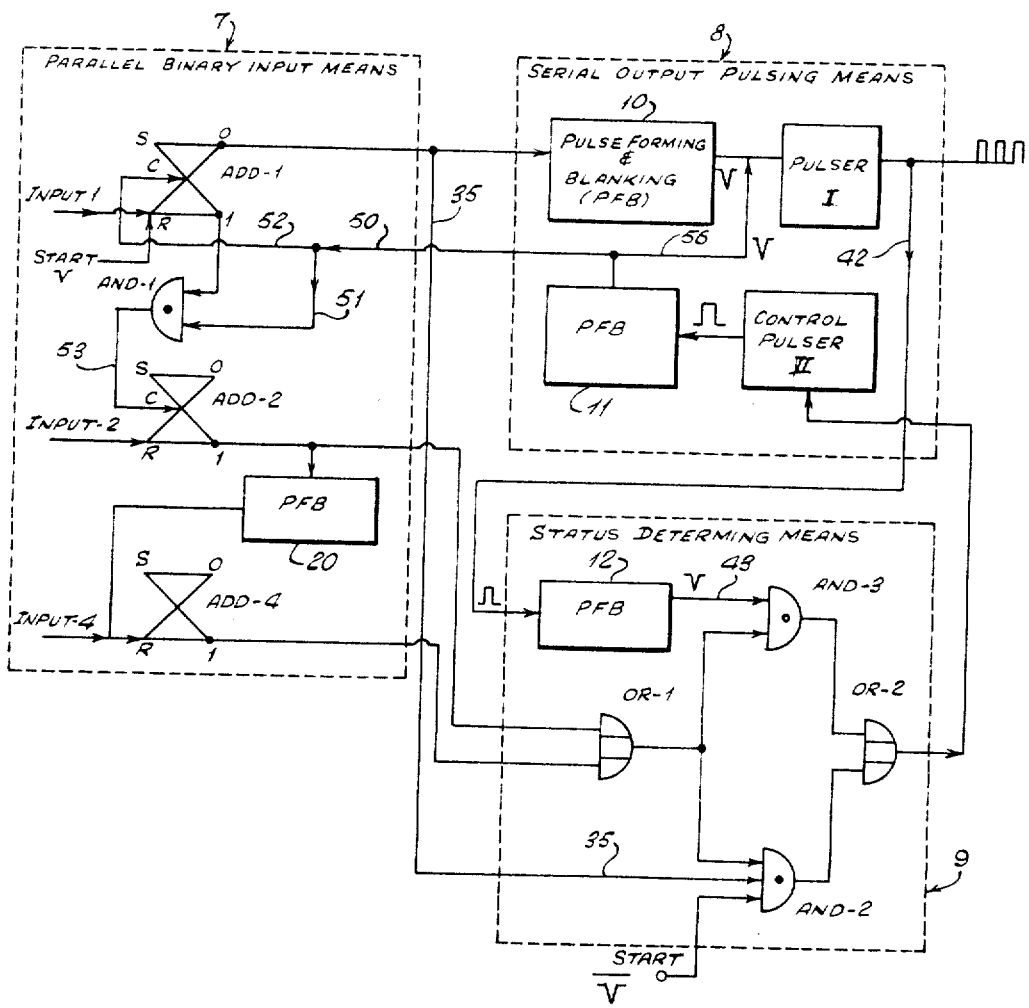

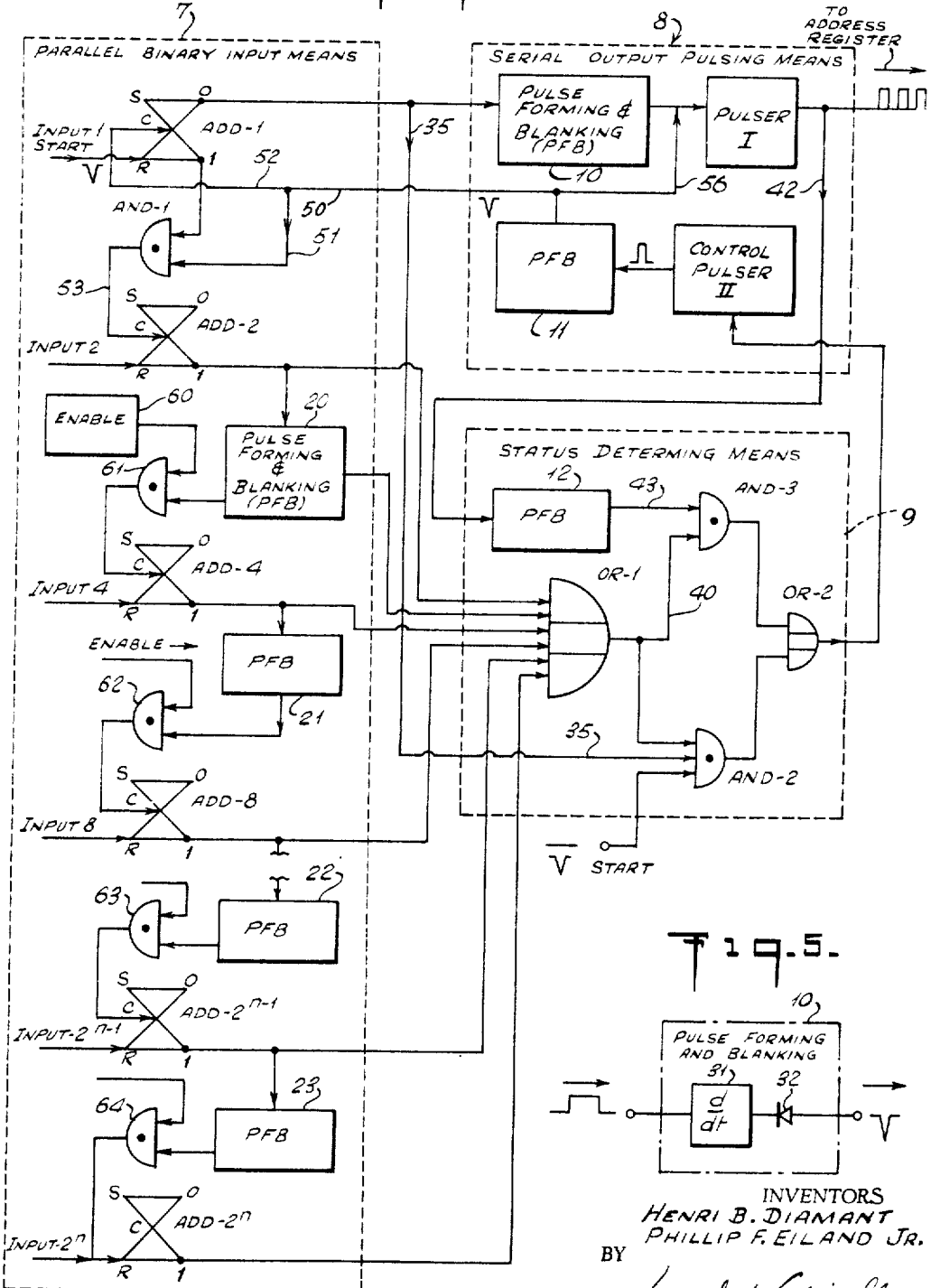

United States Patent Office 3,277,446
Patented Oct. 4, 1966

3,277,446
ADDRESS MODIFICATION SYSTEM AND NOVEL PARALLEL TO SERIAL TRANSLATOR THEREFOR
Henri B. Diamant and Phillip Frank Eiland, Jr., State College, Pa., assignors to HRB-Singer, Inc., State College, Pa., a corporation of Delaware
Filed July 5, 1962, Ser. No. 207,738
11 Claims. (Cl. 340—172.5)

This invention relates to an electronic computing system for providing tabulated information arranged according to subclasses or sub-division of a main class. More particularly, this invention relates to a means for modifying the addresses at which information is stored or from which information is read out to provide compilations arranged in sub-divisions of a main grouping. Also, this invention includes a novel translator which receives address modification signals in the form of a parallel binary input and translates such signals to produce a serial decimal output.

Electronic computers have been used for many applications involving large amounts of tabulating. In commercial computing systems which are used for accounting purposes, such tabulations include large amounts of data and may be in the form of customer statements, expense distribution forms, sales analyses, and the like. However, because of the large amounts of input data involved, it is sometimes desirable to provide a further breakdown of the tabulations. As an example, a company may wish to know which of its sub-divisions have made particular purchases or sales. Also, a company may wish to have a breakdown of various expenses which are related to particular products rather than all products in general or it may wish to know the sales of particular items rather than the total sales of all the items. The foregoing is only illustrative and those skilled in the are may readily think of similar applications.

According to this invention, the main location of selected information is sub-divided according to a desired pattern and specific items thereof are earmarked for particular sub-locations. The information which is applied to a computer is categorized by the addressing system which locates the information in the storage medium. The address of a signal is conventionally understood to represent a specific location in the storage unit to which items of information having a common property are stored. Such addresses may be indicated by a predetermined number arranged with the input information. Prior systems have attempted to modify the address system so as to create sub-classes of the input information by adding a number to the address associated with the input information according to the sub-classes desired. Such systems have utilized a separate adder for applying both the sub-class signal as well as the main-class signal and the sum is applied directly to the adding register. The use of a separate adder requires additional circuitary controlling the application of the input signals as well as requiring control circuitry to shift the added output into the address register. This becomes relatively cumbersome and inefficient, as well as increasing the cost of the computer.

An object of this invention is to provide a computer having novel means for simply modifying the address in an address register allowing main address signals to be applied directly to the address register.

A further object of this invention is to provide a simple address modification means which may be applied directly to the address register without requiring separate adding circuitry.

Still another object of this invention is to provide a computer having means for receiving signals representing the main address and signals representing the modification to the address which signals can be successively applied to the address register.

Still another object of this invention is to provide an address modification means which can simply convert parallel binary input signals to serial decimal output signals.

Still another object of this invention is to provide a means for translating binary information to a serial form for easy addition to a stored serial signal.

Yet another object of this invention is to provide an address modification means to obtain sub-categories of information within a main category.

Yet another object of this invention is to provide an improved translator for translating parallel input signals to serial output signals.

Briefly, our invention comprises a computing system in which the addresses of input information are applied to an address register and stored therein in the form of a pulse count. After the address has been so stored, we provide an address modification means which adds additional predetermined serial pulses to the pulse count so as to modify the address stored in the register. Our novel address modification means includes a translator for converting parallel binary input signals into a serial decimal output which output is applied directly to the address register without utilizing any intervening addition circuitry.

In one aspect of our invention, our novel parallel to serial translator comprises a plurality of binary input means and pulsing means which produce serial output signals depending upon the state of the parallel binary inputs. The pulsing means includes means for determining the status of the binary inputs to provide a control signal. The status determining means does not produce any output signal when the binary inputs for binary inputs higher than one are in a relatively off state. This control signal then sequentially turns on and off the first binary input and controllably turns on and off the second binary input in a manner to produce successive serial outputs.

The above mentioned and other features and objects of this invention and the manner of attaining them will become more apparent and the invention itself will be best understood by reefernce to the following description of an embodiment of the invention taken in conjunction with the accompanying drawing, wherein:

FIGURE 3b is a symbol representing the circuit of FIGURE 3a; and

FIGURE 4 is a detailed block diagram of our novel address modifications means;

FIGURE 5 is a diagram showing the internal circuitry of a pulse forming and blanking means;

FIGURE 6 is a detailed block diagram of the novel address modification corresponding to a modification between 1 and 7.

While our invention is generally applicable to all computing systems in which an address modification is desired to an address stored in a register which is responsive to serial input pulses, it is particularly intended as an improvement over the invention described in our co-pending application Serial No. 175,008, filed February 23, 1962, the contents of which may be deemed to be incorporated in this application by this reference thereto. In that application, there is shown a memory attachment which can be used to augment the storage capacity and extend the operational capabilities of the prior art accounting machines without affecting the normal operation or the normal structure thereof in any way. The block diagram of FIGURE 1 is intended to represent parts of a conventional computer and specifically refers to the computer of the said application.

Figure 1:
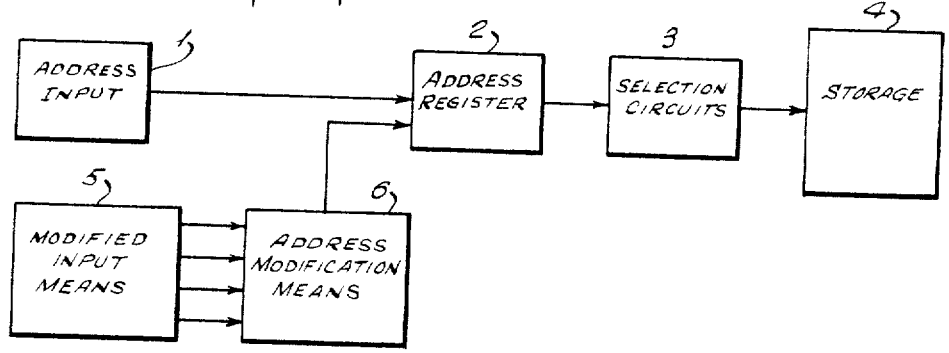
FIGURE 1 is a block diagram of our electronic computing system incorporating the address modification means.

There is shown in FIGURE 1 an address input indicated schematically by the numeral 1. The address input may comprise means for producing input signals in response to holes which are suitably provided in a standard punched card. Such holes produce information signals some of which are intended to represent the address of the item of information which is to be applied to the storage medium 4. The address inputs are applied from the input 1 to an address register 2 and the output from the address register is applied to storage selection circuits 3 to identify and select the specific location in the storage circuit at which the informational signal will be stored.

As an example, suppose that the punched card has a number of punches in three successive columns so as to produce a number 100 in the address register. The number 100 may be taken to represent the identification of a particular company. Similarly, a number 110 may represent the identification of another company. Each of these companies may have sub-divisions making numerous purchases and may wish to have tabulated information concerning such purchases according to sub-divisions. Therefore, address modifier information corresponding to particular sub-divisions is associated with the main address. Such modification information may consist of punched holes in preselected desired columns and rows in the punched card. Company 100 may wish to have the information broken down into ten categories, for example, and therefore, the address modifier information will be represented by punched holes corresponding to numbers 0 through 9. These numbers, 0 through 9, will be in the form of a binary input corresponding to the presence or the absence of a punched hole. If company 100 requires only eight sub-divisions (corresponding to a modification from 0–7), then three brushes may be arranged to receive pulses from corresponding holes in three successive rows of the card. The output information from the brushes is applied in parallel form to the input 6 of the address modification means. Accordingly, the modified input means 5 is intended to represent a conventional reader and translator which translates punched holes in predetermined rows into positive parallel input signals.

Figure 2:
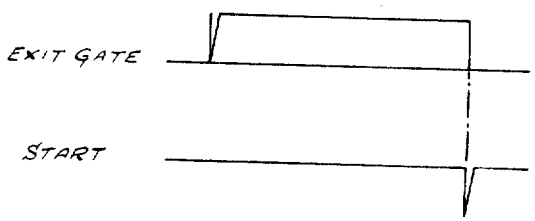
FIGURE 2 is a timing diagram illustrating the time at which the address modification means applies its signals to the address register.

In the computer of the aforementioned application, all of the address signals are applied to the address register during a predetermined time period which is illustrated diagrammatically in FIGURE 2 as an exit gate (the term exit gate having the same meaning as in the aforementioned application). In our invention the address modifying pulses are applied to the address register after the main address signals are stored therein; therefore, we use a start signal (FIGURE 2) which occurs after the end of the exit gate. Conventionally, this start signal may be a negative pulse and may be conveniently obtained by differentiating the exit gate and utilizing only the differential of the trailing edge. Obviously, other means may be utilized to produce a start signal for other applications other than those which may be used in connection with the aforementioned application.

Figure 3B:
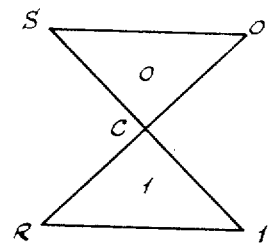
Figure 3A:
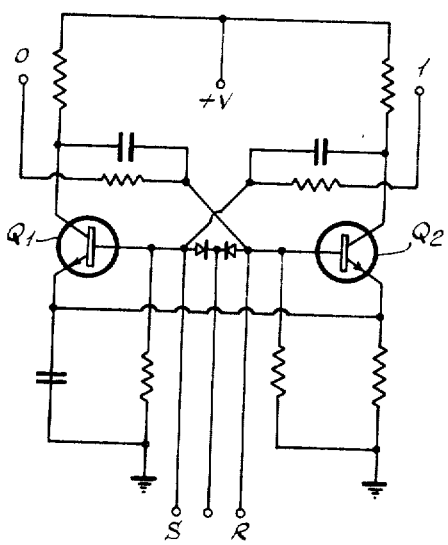
FIGURE 3a is a circuit diagram of our flip-flops which are used as binary outputs.

Referring to FIGURE 4, there is shown an address modification means which may be used in the general case in which the modification required is from 1 to $2^n$ while in FIGURE 6 there is shown a highly efficient, simple and novel specialized form of the general modification means. In FIGURE 4, there is shown a plurality of binary input means which I have indicated as ADD–1, ADD–2 . . . AD–$2^n$. Each of the binary inputs are flip-flops, the circuitry of which is conventional, but one form of which is shown in FIGURE 3a. The circuitry of FIGURE 3a is also standard and its operation will be apparent to those skilled in the art. The hourglass type symbol of FIGURE 3b will be used herein to represent the circuit of FIGURE 3a.

The flip-flop of FIGURE 3a has input terminals represented by the letters S and R representing the SET and RESET states respectively. The output terminals are indicated by the numerals 0 and 1 and will be designated as OUTPUT–0 and OUTPUT–1 respectively. When the flip-flop is in the normal state, which by convention corresponds to the RESET state, OUTPUT–0 will be negative while the OUTPUT–1 is positive. When the flip-flop is flipped so that it is in the SET state, the OUTPUT–0 will be positive while the OUTPUT–1 will be negative. The terms negative and positive are intended only as relative terms to distinguish two different electrical levels. Actually, the negative output may be a 0 voltage level or even a positive level and the positve output would be at a relatively higher level.

Figure 3C:
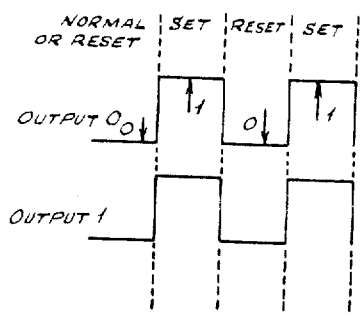
FIGURE 3c is a waveform diagram illustrating the outputs of the flip-flop of FIGURE 3b.

As shown in FIGURE 3a, the transistors $Q_1$ and $Q_2$ are of the NPN variety and accordingly, a negative signal applied to the S terminal will cause the flip-flop to flip to the SET state. Also, a positive signal applied to the S terminal when transistor $Q_1$ is off (SET state) will cause the flip-flop to flip to place it in the RESET state. FIGURE 3c represents the waveforms of the outputs at OUTPUT–0 and OUTPUT–1 for the SET and RESET states. It is apparent, however, that both negative and positive signals can be used to flip the flip-flop depending upon its state and depending upon the terminals to which the signals are applied. It will also be apparent that a negative signal applied to terminal R when the flip-flop is in the RESET state will have no effect. Further, it will be apparent that when a negative signal is applied to the center terminal C, the flip-flop will be caused to change its state regardless of which state it is in.

Referring now to FIGURE 4, there is shown a parallel binary input means 7, serial output pulsing means 8 and struts determining means 9. The signals from modified input means 5 are positive parallel binary signals representing the modification to the address and are applied to each of the flip-flops designated ADD–1, ADD 2 . . . ADD–$2^n$ at the RESET terminals over INPUT–1, INPUT–2 . . . INPUT–$2^n$ leads respectively. Each of the ADD–1 . . . ADD–$2^n$ flip-flops are initially in the normal or RESET states so that a positive input to the RESET terminals cause each to change to the SET state. Accordingly, when a positive signal appears on any of the INPUT–1 . . . INPUT–$2^n$ leads, the respective ADD–1 . . . ADD–$2^n$ flip-flop changes its state so that OUTPUT–1 is negative while OUTPUT–0 is positive.

Before discussing the details of parallel binary input means 7, it is desirable to discuss the operation of the serial output pulsing means 8 which produces the serial signals.

There is shown a pulser I which produces a pulse in response to an input negative pulse. Pulser I is a conventional monostable multivibrator which is known in the art as a one-shot multivibrator. The details of pulser I are conventional and will not be described in this application. Connected to the input of pulser I is a Pulse Forming and Blanking Circuit 10 which will be referred to herein by its initials PFB. The Pulse Forming and Blanking Circuit is used in many locations in my address modification means and it will only be referred to by such initials although the details of an exemplary circuitry are shown in FIGURE 5.

In FIGURE 5, it will be seen that the Pulse Forming and Blanking Circuit (PFB) comprises a differentiator 31 and a blank biased rectifier 32 connected in series thereto. When a positive pulse is applied to the differentiator 31, a positive spike is produced from the leading edge and a negative spike is produced by the trailing edge. Only the negative spike passes through the Pulse Forming and Blanking means because of the presence of back biased diode 32.

In the simple case in which the address is to be modified only by 1, a positive input signal is applied to ADD–1 at INPUT–1 to SET ADD–1 causing OUTPUT–0 to become positive. The positive output at OUTPUT–0 is differentiated in the Pulse Forming and Blanking (PFB) means 10 but the positive spike does not pass therethrough. Accordingly, there is no output from pulser I. Thereafter, when the negative start signal is applied to RESET terminal of ADD–1, flip-flop ADD–1 assumes the RESET state and at this time OUTPUT–0 becomes negative and the differentiator 31 of Pulse Forming and Blanking means 10 passes through diode 22 to activate pulser I to produce a single output pulse. This single output pulse is applied to the address register in a manner heretofore described.

In the preferred embodiment of the invention, it has been found satisfactory to use only a relatively few number of address modifying pulses such as seven and in such application only the flip-flops ADD–1, ADD–2 and ADD–4 are required as shown in FIGURE 6. However, in order to retain the generality of our novel parallel binary to serial decimal output, we have illustrated in FIGURE 4 a number of parallel inputs as ADD–1 . . . ADD–$2^n$. The status determining means determines the status of each of the flip-flops ADD–2 . . . ADD–$2^n$ by connecting the OUTPUT–1 of each into a main OR gate–1. The status of the ADD–1 flip-flop is determined by AND–2 which connects to an input of AND–2 by means of conductor 35, the operation of which will soon be described. The status of pulser I is also determined by AND gate 3 which is connected in feedback relation thereto through a PFB–12.

The serial output pulsing means comprises an additional control pulser II which has the same circuitry as pulser I and connected in the feedback loop comprising PFB–12, AND–3, OR–2, pulser II and PFB–11. A negative input signal causes the pulser II to produce a oneshot positive pulse which is applied to PFB–11 to produce a negative pulse corresponding to the trailing edge thereof. This negative pulse is applied to pulser I over conductor 56 to cause the pulser I to produce a pulse.

If a positive input has been applied to flip-flops ADD–2 . . . Add–$2^n$, causing any to become SET, the respective OUTPUT–1 terminal will be negative. The negative signal will be passed through OR–1 and applied over conductor 40 to AND–3 which produces a negative output signal only when each of the input signals are concurrently negative. When pulser I produces a positive pulse, PFB–12 produces a negative spike corresponding to the trailing edge thereof which passes through AND–3 when AND–3 has been enabled by the setting of any of the flip-flops ADD–2 . . . ADD–$2^n$. The negative spike passes through OR–2 to initiate control pulser II. The positive output pulse from control pulser II causes pulser I to produce another pulse which is then fed back over conductor 42 to AND–3. Thus, it is apparent that pulser I produces pulses successively because of its feedback circuit including control pulser II and its control is therefore dependent upon the states of ADD–2 . . . ADD–$2^n$ which determine the condition of OR–1.

The status determining means has now been completely described except for the presence of AND–2 which has three inputs. One input is connected to the output of OR–1 and another to the negative start signal. The third input connected to AND–2 is from OUTPUT–0 of ADD–1 over conductor 35. AND–2 allows an output signal only when the three inputs are concurrently negative. If there is no input on ADD–1, OUTPUT–0 will be negative which is one of the enabling conditions of AND–2. AND–2 also requires a concurrent negative signal from OR–1 indicating the presence of an input signal on ADD–2 . . . ADD–$2^n$. Thus, when there is a negative signal on conductor 35 and a negative signal from OR–1, the negative start pulse passes through AND–2 and OR–2 to initiate control pulser II which in turn causes pulser I to produce a positive pulse.

DESCRIPTION OF ADD 1–7

Before describing the parallel binary input means 7 for the general case as shown in FIGURE 4, reference is made to FIGURE 6 which contains the ADD 1–7 modification for adding from 1 to 7 pulses.

The serial output pulsing means 8 and status determining means 9 are identical with that of FIGURE 4. The parallel binary input means comprises three flip-flops ADD–1, ADD–2 and ADD–4. OUTPUT–1 of ADD–1 is connected to AND–1, and the negative spike output from PFB–11 which appears on conductor 50 and branch 51 is applied to AND–1. AND–1 is a negative AND-gate and is enabled when OUTPUT–1 from AND–1 is negative allowing the negative spike to pass therethrough. The negative spike from PFB–11 is also applied over branch conductor 52 to terminal C of ADD–1 to cause ADD–1 to change its state regardless of whether it is in the SET or RESET state.

The negative pulse appearing on lead 53 from AND–1 is applied to terminal C of ADD–2 to cause it to change its state. OUTPUT–1 of ADD–2 is applied to PFB–20 which produces a response in the form of a negative spike or pulse only when ADD–2 changes from the RESET to SET states such that OUTPUT–1 changes from positive to negative. The negative spike from PFB–20 is applied to RESET terminal of ADD–4 and causes ADD–4 to flip or RESET only when ADD–4 has previously received a positive INPUT–4 signal and is in the SET state. Thus, a positive INPUT–4 applied at terminal R of ADD–4 will cause ADD–4 to change its state to SET and thereafter a negative pulse applied at the same terminal will cause ADD–4 to flip back to its original state or RESET.

OPERATION OF ADD 1–7

The operation of the ADD 1–7 modification means is as follows. Assume that INPUT–1 is positive and that only one pulse from pulser I is required. Before the start signal, the positive input pulse applied to terminal R causes ADD–1 to SET and OUTPUT–0 becomes positive. Thereafter the negative start signal causes ADD–1 to SET so that OUTPUT–0 becomes negative producing a single pulse through PFB–10. The start signal is also applied to AND–2. However, at this time, OUTPUT–0 which appears on conductor 35 is positive and therefore the start signal does not pass through AND–2 to OR–2. Also, no signal passes from OR–1 since ADD–2 and ADD–4 are RESET and their OUTPUT–1 terminals are positive.

Assume that two pulses are required and that INPUT–2 is positive so that ADD–2 is SET. The start signal will have no effect on ADD–1 since a negative signal applied at terminal R has no effect when ADD–1 is in its normal or RESET state. However, at this time, OUTPUT–0 of ADD–1 is negative and the output from OR–1 is negative. Therefore, the start signal applied to AND–2 passes through OR–2 to control pulser II. The trailing edge of the output pulse from pulser II produces negative spikes appearing on conductors 56 and 50. The spike on conductor 56 causes pulser I to produce a single pulse.

At this time ADD–1 is RESET and OUTPUT–1 is positive so that AND–1 is disabled. The negative spike which appears on branch conductor 51 is not passed to conductor 53 but the negative spike appearing on branch conductor 52 is applied to terminal C of ADD–1 causing ADD–1 to change its state to SET thereby causing OUTPUT–1 to become negative.

As previously mentioned, the single pulse from pulser I is fed back to the system along conductor 42 and the trailing edge produces a negative spike on conductor 43. Since OUTPUT–1 of ADD–2 is negative, a negative signal passes through OR–1 enabling AND–3 thereby allowing the negative spike on conductor 43 to pass through AND–3, through OR–2 to control pulser II causing pulser I to produce the second pulse. However, at this time, the negative spike on conductor 50 applied over branch conductor 51 will pass through AND–1 (since AND–1 was enabled) to cause ADD–2 to change its state to RESET. OUTPUT–1 of ADD–2 becomes positive and no signal appears at the output of PFB–20. Further, when OUTPUT–1 is positive, OR–1 is turned off disabling AND–3. Therefore, the feedback pulse along conductor 42 and its associated negative spike appearing on conductor 43 cannot pass through AND–3. Accordingly, the system produces only two pulses.

Assume that five pulses are desired such that positive parallel signals have appeared on INPUT–1 and INPUT–4. ADD–1 and ADD–4 are SET and their OUTPUT–1 terminals are both negative. Since OUTPUT–0 of ADD–1 is positive, the positive signal appearing on conductor 35 disables AND–2. The start signal applied to terminal R of ADD–1 produces a single pulse as described previously; however, the feedback pulse passes through AND–3 since OR–1 is on, thereby pulsing control pulser II. Control pulser II causes pulser I to produce the second pulse and changes the state of ADD–1 to SET to enable AND–1.

The second pulse from pulser I involves the same sequence of events and a feedback to control pulser II to produce the third pulse from pulser I. However, this time the negative spike appearing on conductor 50 is passed through AND–1 to cause ADD–2 to change its state to SET, OUTPUT–1 of ADD–2 becomes negative and an output signal from PFB–20 is passed to terminal R of ADD–4 switching ADD–4 to RESET.

The third pulse from pulser I is fed back and the negative spike on coductor 43 is passed through AND–3 to pulse control pulser II again, which in turn causes pulser I to produce a fourth pulse. At this time, the negative spike appearing on conductor 50 does not pass through AND–1 but changes the state of ADD–1 to SET to enable AND–1.

The fourth pulse produced by pulser I is similarly fed back through the system to pulse control pulser II which causes pulser I to produce a fifth pulse. At this time, the negative spike appearing on conductor 50 is passed through AND–3 to change the state of ADD–2 as well as ADD–1 causing both of them to assume their normal RESET position. At this time, OUTPUT–1 of all of the ADD flip-flops is positive and thus, the system is essentially at rest. Five pulses as desired, have been produced.

*Description and operation of generalized parallel to serial converter*

Referring again to FIGURE 4, the parallel binary input means have their respective OUTPUT–1 terminals (ADD–2 . . . ADD–$2^{n-2}$) connected to the center terminal of the next higher flip-flop while the OUTPUT–1 terminal of ADD–$2^{n-1}$ is connected to the R terminal of ADD–$2^n$. Enabling pulse generator 60 applies enabling signals to AND gates 61–64 which are located intermediate between the PFBs and the respective OUTPUT–1 terminals.

The enabling pulse generator 60 produces negative pulses synchronized with the time of the start signal so that before the start operation occurs, AND gates 61–64 are disabled. Thus, for example, when a positive pulse is applied at INPUT–2 SETTING ADD–2, although OUTPUT–1 of ADD–2 becomes negative, a negative pulse is not transferred through AND gate 61 to SET ADD–4. The enabling generator 60 is closed sometime after the end of the pulse train produced from pulser 30 and at or before the beginning of the exit gate pulse (FIGURE 2) by conventional timing circuits.

The operation of the generalized parallel to serial converter of FIGURE 4 is similar to that of the specialized ADD 1–7 but one example of its operation will be described herein.

Assume that it is desired to apply ten pulses to the address register and therefore positive pulses have been applied to INPUTS 2 and 8 setting ADD–2 and ADD–8. Accordingly, the OUTPUT–1 terminals of ADD–2 and ADD–8 are negative.

(a) The negative start pulse passes through AND–2 to initiate control pulser II which in turn initiates pulser I to produce pulse 1.

The output from pulser I will be referred to as pulse 1, pulse 2, etc., and the output from pulser II will be referred to as control pulse 1, control pulse 2, etc.

Pulse 1 is fed back through the system to initiate pulser II to produce control pulse 1.

(b) Control pulse 1 produces pulse 2.

Control pulse 1 changes the state of ADD–1 to SET enabling AND–1.

Pulse 2 initiates pulser II to produce control pulse 2.

Control pulse 2 passes through AND–1 changing the state of ADD–2 so that output 1 thereof is positive.

Control pulse 2 changes the state of ADD–1 to disable AND–1.

(c) Control pulse 2 produces pulse 3.

Pulse 3 is fed back initiating pulse II producing control pulse 3.

Control pulse 3 changes the state of ADD–1 enabling AND–1.

(d) Control pulse 3 produces pulse 4.

Pulse 4 is fed back through the system initiating pulser II producing control pulse 4.

Control pulse 4 passes through enabled AND–1 to change the state of ADD–2 to SET.

OUTPUT–1 of ADD–2 becomes negative causing ADD–4 to change its state to SET such that OUTPUT–1 thereof becomes negative, which produces a negative pulse through AND–62 changing the state of ADD–8 to RESET so that OUTPUT–1 thereof is positive.

(e) Control pulse 4 produces pulse 5.

Pulse 5 is fed back through the system producing control pulse 5.

Control pulse 5 changes the state of ADD–1 and enables AND–1.

(f) Control pulse 5 produces pulse 6.

Pulse 6 is fed back through the system to produce control pulse 6.

Control pulse 6 passes through AND–1 to make OUTPUT–1 thereof positive to change the state of ADD–2 to RESET.

Control pulse 6 changes the state of ADD–1 to RESET disabling AND–1.

(g) Control pulse 6 produces pulse 7.

Pulse 7 produces control pulse 7 enabling AND–1.

(h) Control pulse 7 produces pulse 8.

Pulse 8 produces control pulse 8.

Control pulse 8 is applied through enabled AND–1 to change the state of ADD–2 to SET such that output terminal 1 is negative, causing a negative signal to pass through AND–61 to change the state of ADD–4 to RESET such that OUTPUT–1 thereof is positive.

(i) Control pulse 8 produces pulse 9.

Pulse 9 is fed back through the system producing control pulse 9.

(j) Control pulse 9 enables AND–1.

Control pulse 9 produces pulse 10.

Pulse 10 is fed back through the system producing control pulse 10.

Control pulse 10 is applied to ADD–1 and to ADD–2 changing the state of each to RESET such that OUTPUT–1 terminals thereof are positive. Ten pulses have been produced and the system is essentially at rest.

Accordingly, there has been described a greatly simplified electronic computing system and a novel parallel binary to serial decimal address modifier therefor.

It will be recognized that various modifications in the construction of the AND gates, the PFB's, the enabling pulse generators as well as the starting pulse generators will be within the skill of the art. Further, while the system described operates primarily on negative pulses and negative spikes such terms are used only in their relative sense and those skilled in the art could easily make a system which operates on positive pulses if so desired.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. An electronic computing system comprising
   an address register,
   means for applying sequential input address signals into an address register,
   an address modification means having means for converting parallel binary input signals into serial decimal output signals,
   means for producing parallel modifying address signals,
   means for applying said decimal output signals to said address register including timing means responsive to the end of the time period in which said input address signals are applied to said address register to allow said decimal output signals to be applied to said address register.

2. In an electronic computing system in which information is stored on a punched card medium and in which main address information is contained thereon,
   means including a plurality of holes in said card representing address modification information,
   reading means for producing parallel signals responsive to said address modification holes representing a binary number,
   an address register,
   means for applying a count representing said main address information into said register,
   address modification means responsive to said reading means for converting said parallel signals into serial signals corresponding in number to the decimal equivalent of said binary number,
   said address modification means being operative to produce serial output pulses after said main address information has been applied to said register.

3. A parallel binary signal to serial decimal converter comprising
   a plurality of binary storage means $1, 2, 4 \ldots 2^n$, each of which receives one of parallel signals, said storage means corresponding to inputs $1, 2, 4, 8 \ldots 2^n$ respectively,
   means to determine the status of storage means corresponding to $2 \ldots 2^n$ and to produce an output signal when any of such storage means have a signal stored therein,
   means for changing the states of storage means 4 to $2^n$ when the adjacent lower storage means changes from a normally off state,
   pulsing means producing successive pulses in accordance with the output of said status determining means,
   means also responsive to the output of said status determining means to cause storage means 1 to change its state,
   and means responsive to alternate changes of state of storage means 1 to change the state of storage means 2.

4. In an electronic computing system in which information is stored on a punched card medium and in which main address information is contained thereon,
   means including a plurality of holes in said card representing address modification information,
   reading means for producing parallel signals responsive to said address modification holes representing a binary number,
   an address register,
   means for applying a count representing said main address information into said register,
   address modification means responsive to said reading means for converting said parallel signals into serial signals corresponding in number to the decimal equivalent of said binary number,
   said address modification means being operative to produce serial output pulses after said main address information has been applied to said register,
   said address modification means comprising
   a plurality of binary storage means $1, 2, 4 \ldots 2^n$, each of which receives one of parallel signals, said storage means corresponding to inputs $1, 2, 4, 8 \ldots 2^n$ respectively,
   means to determine the status of storage means corresponding to $2 \ldots 2^n$ and to produce an output signal when any of such storage means have a signal stored therein,
   means for changing the status of storage means 4 to $2^n$ when the adjacent lower storage means changes from a normally off state,
   pulsing means producing successive pulses in accordance with the output of said status determining means,
   means also responsive to the output of said status determining means to cause storage means 1 to change its state,
   and means responsive to alternate changes of state of storage means 1 to change the state of storage means 2.

5. The subcombination comprising
   first single pulse means producing a single pulse in response to a predetermined input,
   a second single pulse means,
   means coupling the output of said first single pulse means to the input of said second single pulse means,
   a plurality of binary storage means corresponding respectively to inputs $1, 2, 4, 8 \ldots 2^n$,
   said coupling means including a control means responsive to the conditions of binary storage means corresponding to $2 \ldots 2^n$ and said first single pulse means to produce an output from said second single pulse means.

6. The subcombination comprising means for producing at least 1, 2 and 3 serial signals from parallel inputs in binary form corresponding to numbers from 1 to 3 further comprising
   first and second binary input means for receiving parallel inputs corresponding to the numbers 1 and 2,
   a first single pulse means producing a single pulse in response to a predetermined input,
   a control pulsing means producing activating inputs to said first single pulse means in response to the status of said first pulsing means, and said first and second binary input means.

7. The subcombination comprising means for producing at least 1, 2 and 3 serial signals from parallel inputs in the binary form corresponding to numbers from 1 to 3 further comprising
   first and second binary input means for receiving parallel inputs corresponding to the numbers 1 and 2,
   an AND circuit connected between an output terminal of the first binary input means and an input terminal of the second binary input means,
   a first single pulse means producing a single pulse in response to a predetermined input,
   another output terminal of said first binary input means connected to the input of said first single pulse means,
   a control pulsing means having its output connected to the input of said first single pulse means and said AND circuit and said first binary means, said AND circuit being on when the first binary means is in a predetermined state and said control pulsing means produces an output signal.

8. The subcombination comprising a parallel binary input means comprising
- a plurality of flip-flop means corresponding respectively to the numerals $1, 2, 4 \ldots 2^n$, said flip-flop means being designated by the terms ADD-1, ADD-2, ADD-4 ... ADD$^{2n}$ respectively,
- each flip-flop means having set and reset input terminals and a center terminal, said flip-flop means changing its state in response to a signal applied to said center signal but only changing its state in response to selected signals applied to the set or reset terminals depending upon the state of the flip-flop means,
- a plurality of pulse forming and blanking means coupled from an output terminal of the ADD-2 ... ADD-$2^{n-2}$ flip-flop means to the center terminals of ADD-4 ... ADD-$2^{n-1}$,
- a pulse forming a blanking means coupled from the output terminal of ADD-$2^{n-1}$ to an input terminal of ADD-$2^n$ other than the center terminal
- and one-way means coupling an output terminal ADD-1 to the center terminal of ADD-2, said one way means being controlled by a preselected output from ADD-1.

9. The subcombination of claim 8 further including pulsing means response to the status of ADD-2 ... ADD$^{2n}$,
- and means coupling said pulsing means to said one-way means.

10. A parallel binary signal to serial decimal converter comprising
- a binary register comprising a plurality of binary storage means $1, 2, 4, 8 \ldots 2^n$,
- first single pulse means producing a single pulse in response to a predetermined input,
- feedback means coupling the single pulse output of said first single pulse means to the input of said first single pulse means,
- said feedback means including a control means to open and close the feedback loop,
- means responsive to the status of binary storage $2, 4 \ldots 2^n$ to open and close said control means.

11. The converter of claim 10 including pulse forming and blanking means in said feedback means.

References Cited by the Examiner
UNITED STATES PATENTS

| | | | |
|---|---|---|---|
| 2,914,248 | 11/1959 | Ross et al. | 235—157 |
| 2,982,953 | 5/1961 | Cadden et al. | 340—347 |
| 3,012,724 | 12/1961 | Williams et al. | 235—157 |
| 3,068,464 | 12/1962 | Takahardi et al. | 340—347 |
| 3,111,648 | 11/1963 | Marsh et al. | 340—172.5 |
| 3,157,779 | 11/1964 | Cochrane | 340—172.5 |

ROBERT C. BAILEY, *Primary Examiner.*

MALCOLM MORRISON, *Examiner.*

P. L. BERGER, *Assistant Examiner.*